UNITED STATES PATENT OFFICE.

CARL LUDWIG GRAN, OF HAMBURG, GERMANY, ASSIGNOR TO CONRAD POPPENHUSEN.

IMPROVEMENT IN CEMENTING MATERIALS FOR ORNAMENTAL COMPOUNDS.

Specification forming part of Letters Patent No. 9,693, dated April 26, 1853.

*To all whom it may concern:*

Be it known that I, CARL LUDWIG GRAN, of the free city of Hamburg, in Germany, have invented certain Improvements in Cementing Matters in the Production of Ornamental and other Forms and Substances; and I do hereby declare that the following is a full, clear, and exact description thereof.

My invention relates to the production of artificial veneers or ornamental articles in imitation of or to be substituted for ornamental wood and marble or other stone; and it consists in the employment of the curd obtained from milk, triturated and thoroughly amalgamated with lime or other alkali, and mixed or combined with sawdust, chips, or other fragments of wood, bone, ivory, stone, or other granular or fibrous matter, or with coloring-matter, so that when molded or otherwise formed to the configuration desired, and dried, it will admit of being used as a substitute for veneers and other ornamental work.

I will now proceed to describe the mode of procedure which I have essayed with success.

I take the curd of milk obtained in any manner desired, and after the water has been drained or pressed out of it, and with it I mix about thirty per cent. of slaked lime. These two ingredients I triturate until the mixture assumes a semi-liquid appearance somewhat resembling molasses, but not quite so liquid. When in this condition I add the material or materials which are to give the character to the substance to be produced.

If I desire to produce veneers or imitations of ornamental woods, I take sawdust or chips of various colored wood. Fragments of other substances may, if desired, be added, and thoroughly amalgamate the whole; but if I wish to produce veins of various colors or shades I add the sawdust to the pasty substance in separate colors and separate parcels, and then knead or work them together, and roll or press or mold the mass into any form desired, and dry it by a slow heat.

Instead of sawdust, any coloring-matter may be substituted and mixed in for the purpose of ornamenting or variegating the mass.

When I desire to make artificial stone I substitute for the sawdust fragments of various kinds of mineral or sand or other earth, with coloring-matter, if desired, to give greater variety to the shades; and when I desire to produce surfaces for grinding or polishing metals I substitute emery or other granular or pulverized minerals, such as are used on lead and buff wheels.

The process is to be conducted in the same manner with all the substances which are to be substituted for the sawdust as first described. The proportion of lime may be greatly varied—from two to eighty per cent.; but I usually employ from fifteen to thirty per cent. Instead of lime, other alkalies may be substituted, although I prefer lime slaked in the open air.

If, in the process, it should be found that in triturating the curd and lime the semi-fluid state is not readily obtained, or, when obtained, that it is not sufficiently fluid to receive the other matter, a little water may be added, which will evaporate in the process of drying.

Veneers of a high degree of beauty can be produced on this plan, which can be worked in the same manner as veneers of wood, and which will take a very high and beautiful polish.

Articles of furniture—such as the ornaments—may be molded, and thus produced at much less expense than carving, and of any desired variety of form, color, and veins.

What I claim as my invention, and desire to secure by Letters Patent, is—

The method of making artificial veneers, &c., by combining with sawdust or the equivalent thereof, as herein specified, the curd of milk, and lime or its equivalent, after these latter have been triturated and thoroughly mixed and reduced to a semi-fluid state, substantially as specified.

CARL LUDWIG GRAN.

Witnesses:
G. E. SCHULZE,
C. N. BROMBERG.